(12) United States Patent
Kim

(10) Patent No.: US 9,742,334 B2
(45) Date of Patent: Aug. 22, 2017

(54) ELECTRIC MOTOR SYSTEM FOR VEHICLES AND METHOD OF ADJUSTING COIL WINDING NUMBER OF ELECTRIC MOTOR FOR VEHICLES

(71) Applicant: HYUNDAI MOBIS Co., Ltd., Seoul (KR)

(72) Inventor: Yong Ho Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/940,257

(22) Filed: Nov. 13, 2015

(65) Prior Publication Data
US 2016/0141996 A1    May 19, 2016

(30) Foreign Application Priority Data
Nov. 18, 2014 (KR) .................. 10-2014-0160778

(51) Int. Cl.
*H02P 25/18* (2006.01)
*B60L 11/18* (2006.01)

(52) U.S. Cl.
CPC ........ *H02P 25/188* (2013.01); *B60L 11/1803* (2013.01); *H02P 25/18* (2013.01)

(58) Field of Classification Search
CPC ........... H02P 29/032; H02P 6/002; H02P 3/18
See application file for complete search history.

(56) References Cited

U.S. PATENT DOCUMENTS

| 5,192,887 A | 3/1993 | Theis |
| 6,614,194 B2 * | 9/2003 | Kobayashi ................ H02P 5/68 318/111 |

(Continued)

FOREIGN PATENT DOCUMENTS

| JP | 2002-288588 A | 10/2002 |
| JP | 3835258 B2 | 10/2006 |

(Continued)

OTHER PUBLICATIONS

Tsai, M. C., et al. "Control of a Variable-Winding Brushless Motor with the Application in Electric Scooters." In Electric Machines and Drives Conference, 2001. IEMDC 2001. International IEEE, pp. 922-925, IEEE, 2001. (4 pages in English).

(Continued)

*Primary Examiner* — Shawki S Ismail
*Assistant Examiner* — Muhammad S Islam
(74) *Attorney, Agent, or Firm* — NSIP Law

(57) ABSTRACT

Provided is an electric motor system for vehicles, which adjusts a coil winding number of a vehicle electric motor. The electric motor system for vehicles includes an inverter configured to include a power switching circuit connected to a vehicle battery in parallel and a coil switching circuit connected to the power switching circuit, wherein the coil switching circuit receives and outputs a driving current having different phases which is generated according to a switching operation of the power switching circuit, an electric motor configured to include a plurality of winding coils that receive the driving current and are wound at multi stages, and a controller configured to control a switching operation of the coil switching circuit to adjust a winding number of each of the plurality of winding coils to a maximum coil winding number by serially connecting all of the plurality of winding coils in a low speed driving mode and to adjust the winding number of each of the plurality of winding coils to a minimum coil winding number by serially connecting some of the plurality of winding coils in a high speed driving mode.

12 Claims, 4 Drawing Sheets

(56) References Cited

U.S. PATENT DOCUMENTS

| | | | |
|---|---|---|---|
| 2002/0163262 A1* | 11/2002 | Hsu | H02K 3/28 |
| | | | 310/68 R |
| 2004/0189242 A1* | 9/2004 | Pyntikov | H02P 6/34 |
| | | | 318/721 |
| 2012/0286523 A1* | 11/2012 | Hull | H02P 9/48 |
| | | | 290/40 A |
| 2012/0306424 A1* | 12/2012 | Naik | H02P 25/18 |
| | | | 318/495 |
| 2013/0241458 A1* | 9/2013 | Soma | H02K 5/225 |
| | | | 318/495 |
| 2014/0217946 A1* | 8/2014 | Kume | H02P 25/188 |
| | | | 318/497 |

FOREIGN PATENT DOCUMENTS

| | | |
|---|---|---|
| KR | 10-0276006 B1 | 12/2000 |
| KR | 10-2013-0080630 A | 7/2013 |

OTHER PUBLICATIONS

Korean Office Action issued on Jan. 27, 2016 in counterpart Korean Application No. 10-2014-0160778. (5 pages in Korean).

\* cited by examiner

ELECTRIC MOTOR SYSTEM FOR VEHICLES AND METHOD OF ADJUSTING COIL WINDING NUMBER OF ELECTRIC MOTOR FOR VEHICLES

CROSS-REFERENCE TO RELATED APPLICATIONS

This application claims priority under 35 U.S.C. §119 to Korean Patent Application No. 10-2014-0160778, filed on Nov. 18 2014, the disclosure of which is incorporated herein by reference in its entirety.

TECHNICAL FIELD

The present invention relates to a motor system for vehicles, and more particularly, to a motor system for vehicles, which adjusts a coil winding number of a vehicle electric motor.

BACKGROUND

Generally, hybrid vehicles denote vehicles that drive by using two or more different kinds of motive power sources. In such hybrid vehicles, hybrid electric vehicles (HEVs) denote vehicles that drive by using an engine and an electric motor as motive power sources.

The HEVs are equipped with an electric motor (hereinafter referred to as a vehicle electric motor) that receives a voltage from a battery to generate a driving power for driving a vehicle.

Such vehicle electrode motors are designed to efficiently operate in a high speed driving mode where a vehicle drives at a base speed or more, in addition to a low speed driving mode where a vehicle drives at a low speed lower than the base speed.

In the high speed driving mode, a counter electromotive force which is expressed as a multiplication of a magnetic flux of a coil wound around a stator of an electric motor and a rotating speed of a rotor of the electric motor increases in proportion to the rotating speed, and thus exceeds a voltage of a battery equipped in a vehicle.

Therefore, a design for reducing a winding number for single phase of a serially connected winding coil is needed in order for the counter electromotive force to become lower than a limited voltage of a battery in the high speed driving mode.

On the other hand, in the low speed driving mode, since a current is limited, a high counter electromotive force is needed for generating a maximum torque, and to this end, a design for increasing a winding number for single phase of a winding coil is needed.

In a coil design structure of the related art, a coil winding number cannot be changed while an electric motor is being driven. Therefore, if a coil winding number increases for satisfying the required performance (or the required torque) of an electric motor which is needed in the low speed driving mode, efficiency is reduced due to a weak field control current based on the increased coil winding number in the high speed driving mode, or because a voltage of a battery is limited, the required performance is not satisfied in the high speed driving mode.

Moreover, in the coil design structure of the related art, if a coil winding number is reduced for satisfying the required performance (or the required torque) of the electric motor which is needed in the high speed driving mode, a high winding current should be applied to the electric motor in the low speed driving mode, and thus, since copper loss "$P=I^2r$" expressed as the square "$I^2$" of a winding current "$I$" and a resistance "$r$" of a coil winding increases, efficiency is reduced, or the specification of a limited current cannot satisfy the required performance (or the required torque).

As described above, in the related art where a winding number of a coil wound around a stator cannot be changed when a vehicle electric motor is being driven, it is unable to satisfy both the required performance which is needed in the low speed driving mode and the required performance which is needed in the high speed driving mode.

SUMMARY

Accordingly, the present invention provides an electric motor system for vehicles and a method of adjusting a coil winding number of a vehicle electric motor, which adjust a coil winding number of an electric motor according to a vehicle driving mode so as to satisfy the required performance in a high speed driving mode and a low speed driving mode of a vehicle.

In one general aspect, an electric motor system for vehicles includes: an inverter configured to include a power switching circuit connected to a vehicle battery in parallel and a coil switching circuit connected to the power switching circuit, wherein the coil switching circuit receives and outputs a driving current having different phases which is generated according to a switching operation of the power switching circuit; an electric motor configured to include a plurality of winding coils that receive the driving current and are wound at multi stages; and a controller configured to control a switching operation of the coil switching circuit to adjust a winding number of each of the plurality of winding coils to a maximum coil winding number by serially connecting all of the plurality of winding coils in a low speed driving mode and to adjust the winding number of each of the plurality of winding coils to a minimum coil winding number by serially connecting some of the plurality of winding coils in a high speed driving mode.

In another general aspect, a method of adjusting a coil winding number of a vehicle electric motor includes: determining, by a controller, whether a current vehicle driving mode is a low speed driving mode or a high speed driving mode; performing, by a coil switching circuit connected to an output node of the power switching circuit, a switching operation to adjust a winding number of each of the plurality of winding coils to a maximum coil winding number in the low speed driving mode according to a result of the determination by the controller; and performing, by the coil switching circuit, a switching operation to adjust the winding number of each of the plurality of winding coils to a minimum coil winding number in the high speed driving mode according to a result of the determination by the controller.

Other features and aspects will be apparent from the following detailed description, the drawings, and the claims.

DETAILED DESCRIPTION OF EMBODIMENTS

Figure 1:
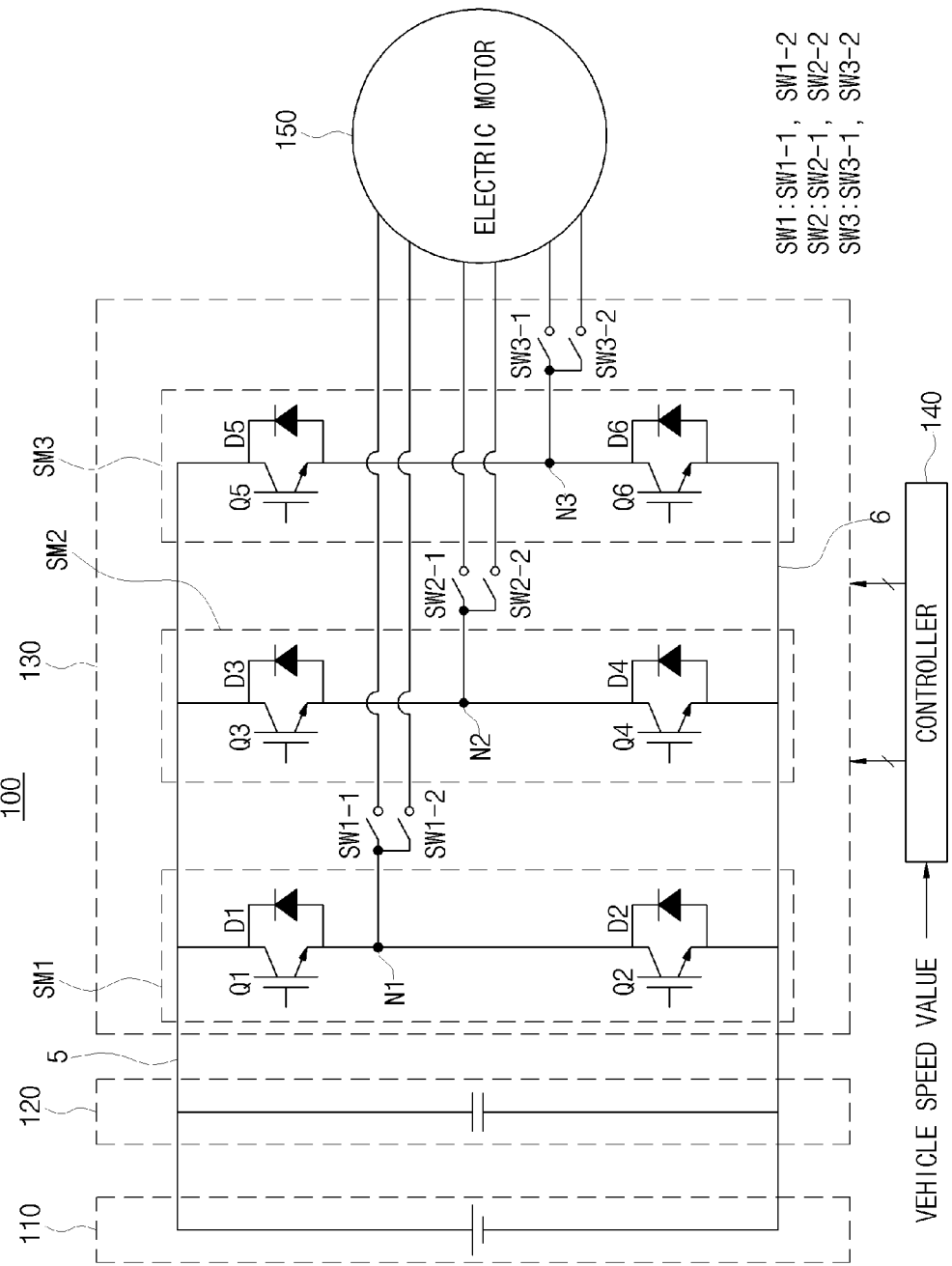
FIG. 1 is a diagram illustrating an electric motor system for vehicles according to an embodiment of the present invention.

Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout. It will be understood that although the terms including an ordinary number such as first or second are used herein to describe various elements, these elements should not be limited by these terms. These terms are only used to distinguish one element from another element.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Hereinafter, embodiments of the present invention will be described in detail with reference to the accompanying drawings.

FIG. 1 is a diagram illustrating an electric motor system 100 for vehicles according to an embodiment of the present invention.

Referring to FIG. 1, the electric motor system 100 for vehicles according to an embodiment of the present invention may include a vehicle battery 110, a smoothing capacitor 120, an inverter 130, a controller 140, and an electric motor 150.

The vehicle battery 110 may be a secondary battery that outputs a direct current (DC) voltage. The secondary battery may be a nickel metal hybrid battery, a lithium-ion battery, or the like. The vehicle battery 110 may be connected to the smoothing capacitor 120 in parallel to apply the DC voltage to the smoothing capacitor 120.

The smoothing capacitor 120 may smooth the DC voltage applied from the vehicle battery 110 and may apply the smoothed DC voltage to a power line 5 and a ground line 6 which are included in the inverter 130.

The inverter 130 may convert the smoothed DC voltage, applied from the smoothing capacitor 120, into an alternating current (AC) voltage (an AC current) for driving the electric motor. To this end, the inverter 130 may include a plurality of power switching circuits SM1 to SM3 and a plurality of coil switching circuits which are respectively connected to output nodes N1 to N3 of the power switching circuits SM1 to SM3.

In an embodiment of the present invention, the plurality of power switching circuits SM1 to SM3 may include first to third power switching circuits SM1 to SM3 and first to third coil switching circuits SW1 to SW3 which are respectively connected to output nodes N1 to N3 of the power switching circuits SM1 to SM3.

The first to third power switching circuits SM1 to SM3 may be connected in parallel between the power line 5 and the ground line 6.

The first power switching circuit SM1 may include a pull-up transistor Q1, a pull-down transistor Q2, and the output node N1 that serially connects the pull-up transistor Q1 to the pull-down transistor Q2.

The second power switching circuit SM2 may include a pull-up transistor Q3, a pull-down transistor Q4, and the output node N2 that serially connects the pull-up transistor Q3 to the pull-down transistor Q4.

The third power switching circuit SM3 may include a pull-up transistor Q5, a pull-down transistor Q6, and the output node N3 that serially connects the pull-up transistor Q5 to the pull-down transistor Q6.

A plurality of inverse-parallel diodes D1, D3 and D5 may be respectively connected to the pull-up transistors Q1, Q3 and Q5 in parallel. Each of the inverse-parallel diodes D1, D3 and D5 may allow a current to flow from an emitter to a collector of a corresponding pull-up transistor.

Likewise, a plurality of inverse-parallel diodes D2, D4 and D5 may be respectively connected to the pull-down transistors Q2, Q4 and Q6 in parallel.

The pull-up transistors Q1, Q3 and Q5 and the pull-down transistors Q2, Q4 and Q6 may each perform a switching operation according to a control signal applied from the controller 140. Here, the control signal may be a pulse width modulation (PWM) signal.

Therefore, the first to third power switching circuits SM1 to SM3 may respectively output first to third driving currents having different phases through the output nodes N1 to N3 according to the PWM signal.

The first to third power switching circuits SM1 to SM3 may be respectively connected to the output nodes N1 to N3 of the power switching circuits SM1 to SM3 to supply the first to third driving currents to the electric motor 150.

Each of the first to third coil switching circuits SW1 to SW3 may include a plurality of switches which are connected to each other in parallel.

If the electric motor 150 includes a winding coil which is wound at two stages for each phase, each of the first to third coil switching circuits SW1 to SW3 may include two switches which are connected to each other in parallel. If the electric motor 150 includes a winding coil which is wound at three stages for each phase, each of the first to third coil switching circuits SW1 to SW3 may include three switches which are connected to each other in parallel.

In the embodiment of FIG. 1, the electric motor 150 is assumed as including two switches which are connected to each other in parallel. In this case, the first coil switching circuit SW1 may include a 1-1st switch SW1-1 and a 1-2nd switch SW1-2 which are connected in parallel between the first output node N1 and the electric motor 150, and the second coil switching circuit SW2 may include a 2-1st switch SW2-1 and a 2-2nd switch SW2-2 which are connected in parallel between the second output node N2 and the electric motor 150. Also, the third coil switching circuit SW3 may include a 3-1st switch SW3-1 and a 3-2nd switch SW3-2 which are connected in parallel between the third output node N3 and the electric motor 150.

Each of the switches SW1-1, SW1-2, SW2-1, SW2-2, SW3-1 and SW3-2 may perform a switching operation in order for a coil winding number of the electric motor 150 to vary according to the required performance. This will be described in detail with reference to FIGS. 2 to 4.

The controller 140 may control the switching operations of the power switching circuits SM1 to SM3 and may control the switching operations of the switches of the coil switching circuits SW1 to SW3 for adjusting the coil winding number of the electric motor 150.

The controller 140 may control the switching operations of the coil switching circuits SW1 to SW3 in order for the coil winding number of the electric motor 150 to become a maximum coil winding number in the low speed driving mode, and in the high speed driving mode, the controller 140 may control the switching operations of the coil switching circuits SW1 to SW3 in order for a winding number of each of the plurality of winding coils to become a minimum coil winding number.

The electric motor 150 may be a driving motor that generates a torque for driving, for example, a drive wheel of a hybrid vehicle, an electric vehicle, or the like.

Hereinafter, a method of adjusting a coil winding number of an electric motor by using the coil switching circuits illustrated in FIG. 1 will be described in detail with reference to FIGS. 2 to 3.

Figure 2:
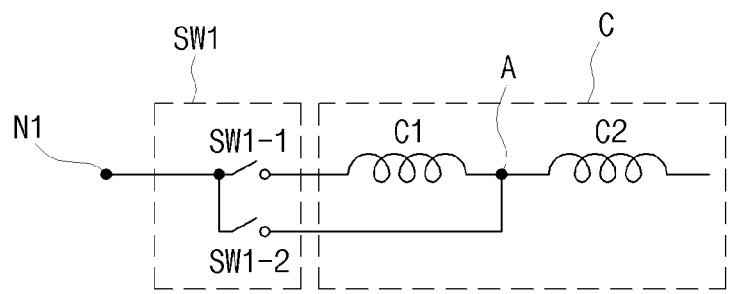
FIG. 2 is an equivalent circuit diagram illustrating a connection structure between a first coil switching circuit illustrated in FIG. 1 and a corresponding winding coil of an electric motor.

FIG. 2 is an equivalent circuit diagram illustrating a connection structure between the first coil switching circuit illustrated in FIG. 1 and a corresponding winding coil of an electric motor.

Referring to FIG. 2, the first coil switching circuit SW1 may connect the first output node N1 to all winding coils or some winding coils, for adjusting a coil winding number.

In detail, the 1-1st switch SW1-1 of the first coil switching circuit SW1 may be connected between the first output node N1 and a winding coil C which is wound at two stages, and may control an electrical connection between the output node N1 and the winding coil C.

The winding coil C which is wound at two stages may include a first winding coil C1 and a second winding coil C2 which are serially connected to a connection node A, and the 1-2nd switch SW1-2 of the first coil switching circuit 130 may control an electrical connection between the first output node N1 and the connection node A.

In the low speed driving mode, since a maximum coil winding number should be provided for obtaining a maximum torque, the first switch SW1-1 may be turned on, and the second switch SW1-2 may be turned off.

Figure 3:
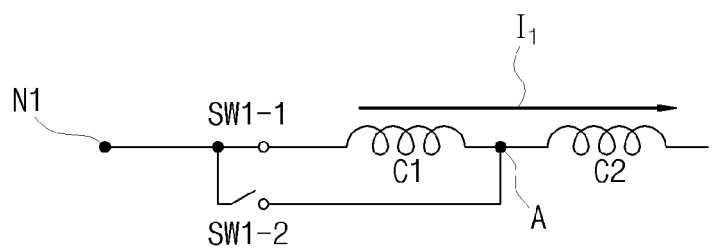
FIGS. 3 and 4 are diagrams for describing an operation of an equivalent circuit illustrated in FIG. 2.

According to such a switching operation, as illustrated in FIG. 3, the first winding coil C1 may be serially connected to the second winding coil C2.

Therefore, a maximum coil winding number for allowing a driving current $I_1$ to be applied to all the first and second winding coils C1 and C2 may be provided.

On the other hand, in the high speed driving mode, since a minimum coil winding number should be provided for reducing a counter electromotive force, the first switch SW1-1 may be turned off, and the second switch SW1-2 may be turned on.

Figure 4:
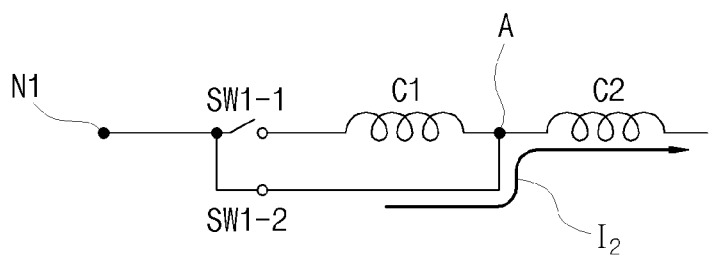

According to such a switching operation, as illustrated in FIG. 4, a minimum coil winding number for allowing a driving current $I_2$ to be applied to the second winding coil C2 may be provided.

Figure 5:
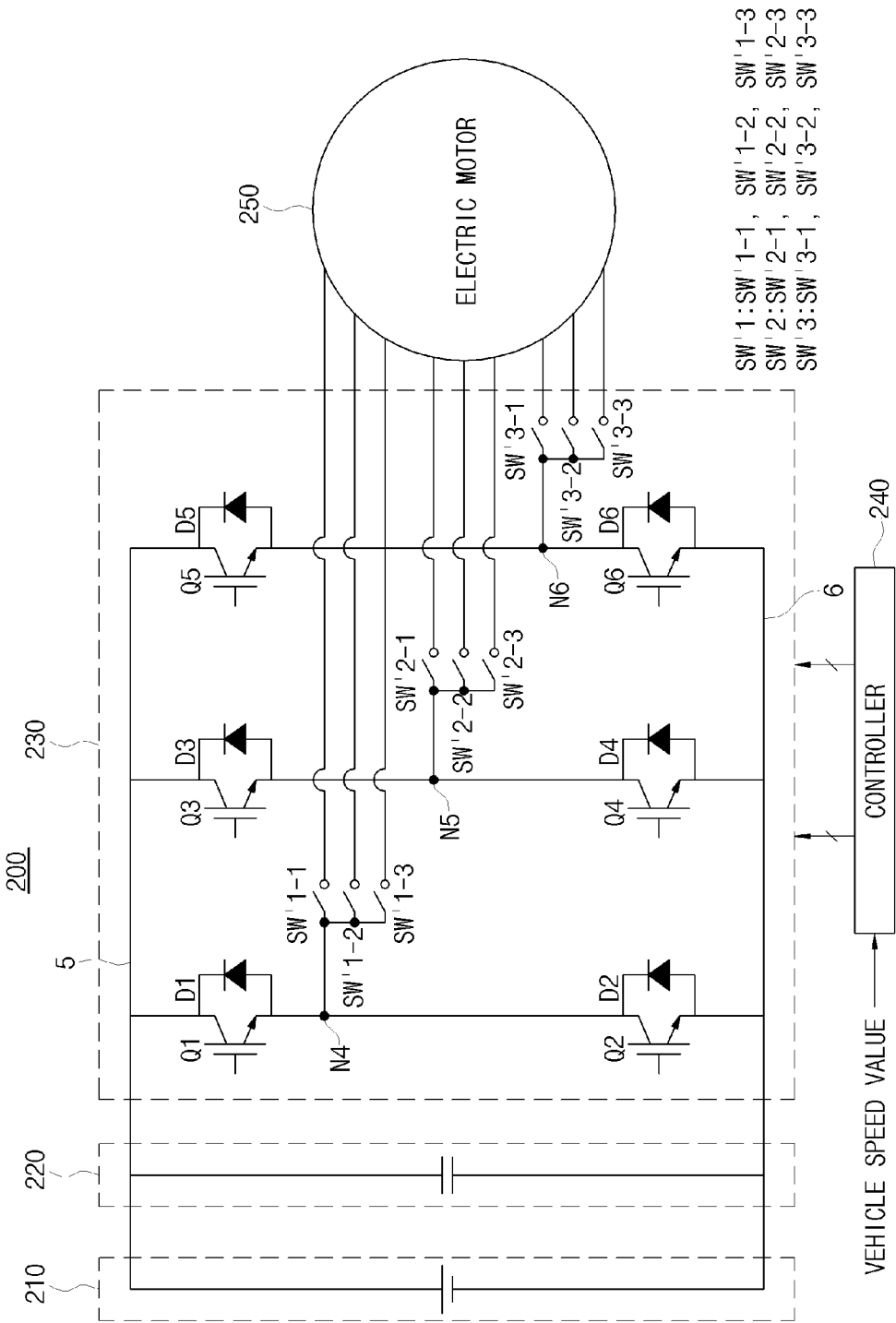
FIG. 5 is a diagram illustrating an electric motor system for vehicles according to another embodiment of the present invention.

FIG. 5 is a diagram illustrating an electric motor system for vehicles according to another embodiment of the present invention.

An electric motor 250 illustrated in FIG. 5 has a difference with the electric motor 150 of FIG. 1 in that the electric motor 250 includes a winding coil which is wound at three stages.

Except that one switch is added into each of the coil switching circuits illustrated in FIG. 1, the electric motor system for vehicles according to another embodiment of the present invention includes the same elements as those of the electric motor system of FIG. 1.

Therefore, in the electric motor system for vehicles according to another embodiment of the present invention, only a coil switching circuit will be described, and the descriptions of FIG. 1 are applied to the other elements.

A first coil switching circuit SW'1 may include a 1-1st switch SW'1-1, a 1-2nd switch SW'1-2, and a 1-3rd switch SW'1-3 which are connected in parallel between an output node N4 and the electric motor 250, and a second coil switching circuit SW'2 may include a 2-1st switch SW'2-1, a 2-2nd switch SW'2-2, and a 2-3rd switch SW'2-3 which are connected in parallel between an output node N5 and the electric motor 250. Also, a third coil switching circuit SW'3 may include a 3-1st switch SW'3-1, a 3-2nd switch SW'3-2, and a 3-3rd switch SW'3-3 which are connected in parallel between an output node N6 and the electric motor 250.

Figure 6:
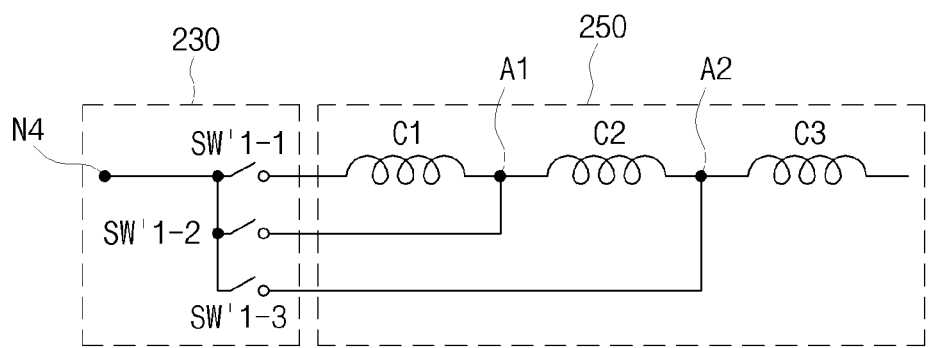
FIG. 6 is an equivalent circuit diagram illustrating a connection structure between a first coil switching circuit illustrated in FIG. 5 and a corresponding winding coil of an electric motor.

FIG. 6 illustrates a connection structure between the first coil switching circuit SW1 and a winding coil of the electric motor 250.

Referring to FIG. 6, the 1-1st switch SW'1-1 may be connected between the output node N4 and the first winding coil C1 to control an electrical connection between the output node N4 and the first winding coil C1.

The 1-2nd switch SW'1-2 may control an electrical connection between the output node N4 and a first connection node A1 which serially connects the first winding coil C1 to the second winding coil C2.

The 1-3rd switch SW'1-3 may control an electrical connection between the output node N4 and a second connection node A2 which serially connects the second winding coil C2 to the third winding coil C3.

In the embodiment of FIG. 6, a coil winding number may be incrementally adjusted through switching operations of three switches, and thus, a switching operation may be further performed in a middle speed driving mode in addition to the low speed driving mode and the high speed driving mode.

That is, the electric motor system for vehicles according to another embodiment of the present invention may further perform the switching operation based on the middle speed driving mode for changing a coil winding number to a middle coil winding number that is greater than a minimum coil winding number and is less than a maximum coil winding number.

As described above, if the switching operation based on the middle speed driving mode is added, the required performance of the electric motor may be finely controlled.

For example, in the low speed driving mode, when the switching operation is controlled to turn on the 1-1st switch SW'1-1 and turn off the 1-2nd switch SW'1-2 and the 1-3rd switch SW'1-3, a coil winding number may be adjusted to a maximum coil winding number that allows a driving current of the inverter 230 to be applied to all the first to third winding coils C1 to C3.

In the high speed driving mode, when the switching operation is controlled to turn off the 1-1st switch SW'1-1 and the 1-2nd switch SW'1-2 instead of the 1-3rd switch SW'1-3, a coil winding number may be adjusted to a minimum coil winding number that allows the driving current of the inverter 230 to be applied to only the third winding coil C3.

In the middle speed driving mode, when the switching operation is controlled to turn off the 1-1st switch SW'1-1 and the 1-3rd switch SW'1-3 instead of the 1-2nd switch SW'1-2, a coil winding number may be adjusted to a middle coil winding number that allows the driving current of the inverter 230 to be applied to only the second and third winding coils C2 and C3.

As described above, the coil switching circuits and the switching operations thereof according to the embodiments of FIGS. 1 and 5 may be controlled, and thus, the coil winding number of the electric motor is freely changed. That is, in a low-speed low torque, a counter electromotive force and an inductance increase by using all winding coils, and in a high-speed low torque or a middle-speed middle torque, the counter electromotive force and the inductance increase by using some winding coils.

Figure 7:
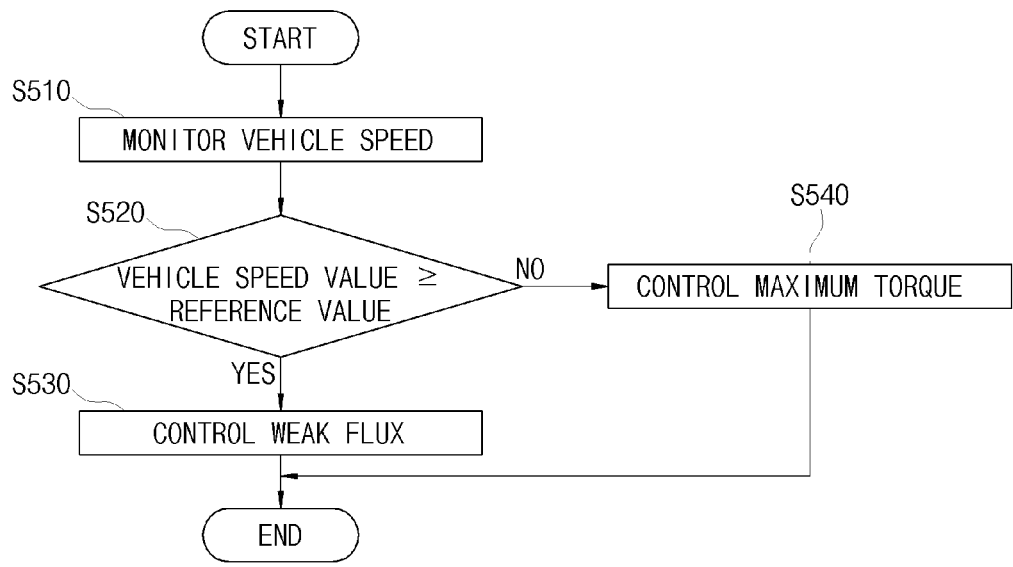
FIG. 7 is a flowchart illustrating a method of adjusting a coil winding number of a vehicle electric motor according to an embodiment of the present invention.

FIG. 7 is a flowchart illustrating a method of adjusting a coil winding number of a vehicle electric motor according to an embodiment of the present invention.

Referring to FIG. 7, in step S510, the controller may monitor a vehicle driving mode according to a current vehicle speed value transferred from a vehicle speed sensor.

Subsequently, in step S520, the controller may compare the current vehicle speed value with a predetermined reference value to determine whether a current vehicle driving mode is the low speed driving mode or the high speed driving mode. For example, the predetermined reference value may be 3,000 RPM, and when it is determined that the current vehicle speed value is less than 3,000 RPM, the controller may determine that a vehicle is currently driving in the low speed driving mode. Also, when it is determined that the current vehicle speed value is equal to or more than 3,000 RPM, the controller may determine that the vehicle is currently driving in the high speed driving mode.

When it is determined in step S520 that the current vehicle speed value is equal to or more than the reference value, a weak flux control operation may be performed according to a switching operation of a coil switching circuit that adjusts a total coil winding number to a minimum coil winding number or a middle coil winding number in step S530.

For example, when it is determined in step S520 that the current vehicle speed value is less than the reference value, a maximum torque control operation may be performed according to a switching operation of the coil switching circuit that adjusts the total coil winding number to a maximum coil winding number in step S540.

As described above, according to the embodiments of the present invention, a coil winding number of an electric motor may be adjusted according to a switching operation based on a mode of a switching device connecting an output terminal of an inverter to a multi-stage coil winding of the electric motor while the electric motor is being driven, the required performance which is needed in the low speed driving mode and the required performance which is needed in the high speed driving mode are all satisfied.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electric motor system for vehicles configured to adjust a coil winding number of a vehicle electric motor, the electric motor system comprising:
   an inverter comprising a first power switching circuit connected to a vehicle battery in parallel, a second power switching circuit connected to the vehicle battery in parallel, a third power switching circuit connected to the vehicle battery in parallel, a first coil switching circuit connected to the first power switching circuit, and a second coil switching circuit connected to the second power switching circuit;
   an electric motor comprising:
      a first winding coil configured to receive a driving current and comprising a first stage and a second stage, and
      a second winding coil configured to receive the driving current and comprising a first stage and a second stage; and
   a controller configured to control:
      a switching operation of the first coil switching circuit by serially connecting the first stage of the first winding coil and the second stage of the first winding coil, to adjust a winding number of the first winding coil to a maximum coil winding number in a low speed driving mode, and by connecting the second stage of the first winding coil and disconnecting the first stage of the first winding coil, to adjust the winding number of the first winding coil to a minimum coil winding number in a high speed driving mode, and
      a switching operation of the second coil switching circuit by serially connecting the first stage of the second winding coil and the second stage of the second winding coil, to adjust a winding number of the second winding coil to a maximum coil winding number in the low speed driving mode, and by connecting the second stage of the second winding coil and disconnecting the first stage of the second winding coil, to adjust the winding number of the second winding coil to a minimum coil winding number in the high speed driving mode,
   wherein the first coil switching circuit is configured to receive and output the driving current having a first phase generated according to a switching operation of the first power switching circuit,
   wherein the second coil switching circuit is configured to receive and output the driving current having a second phase generated according to a switching operation of the second power switching circuit,
   wherein the first winding coil further comprises a third stage, and
   wherein the first coil switching circuit comprises:
      a first switch configured to control an electrical connection between the output node of the first power switching circuit and the first stage of the first winding coil;
      a second switch configured to control an electrical connection between the output node of the first power switching circuit and a first connection node that serially connects the first stage of the first winding coil and the second stage of the first winding coil; and a third switch configured to control an electrical connection between the output node of the first power switching circuit and a second connection node that serially connects the second stage of the first winding coil and the third stage of the first winding coil.

2. The electric motor system of claim 1, wherein:
the first power switching circuit and the second power switching circuit each comprise a pull-up transistor, a pull-down transistor, and an output node that serially connects the pull-up transistor to the pull-down transistor, and
the first coil switching circuit is configured to perform the switching operation to connect the output node of the first power switching circuit to either one or both of the first stage of the first winding coil and the second stage of the first winding coil.

3. The electric motor system of claim 2, wherein the first coil switching circuit comprises:
a first switch configured to control an electrical connection between the output node of the first power switching circuit and the first stage of the first winding coil; and
a second switch configured to control an electrical connection between the output node of the first power switching circuit and a connection node that serially connects the first stage of the first winding coil and the second stage of the first winding coil.

4. The electric motor system of claim 2, wherein in the low speed driving mode, the first switch is turned on according to control by the controller, and the second and third switches are turned off according to control by the controller.

5. The electric motor system of claim 2, wherein in the high speed driving mode, the first and second switches are turned off according to control by the controller, and the third switch is turned on according to control by the controller.

6. The electric motor system of claim 2, wherein in a middle speed driving mode,
the controller is configured to control the switching operation of the first coil switching circuit by serially connecting the second stage of the first winding coil and the third stage of the first winding coil, such that the first and third switches are turned off and the second switch is turned on.

7. The electric motor system of claim 3, wherein in the low speed driving mode, the first switch is turned on according to control by the controller, and the second switch is turned off according to control by the controller.

8. The electric motor system of claim 3, wherein in the high speed driving mode, the first switch is turned off according to control by the controller, and the second switch is turned on according to control by the controller.

9. A method of adjusting a coil winding number of an electric motor in an electric motor system for vehicles, which comprises an inverter comprising a first power switching circuit connected to a vehicle battery in parallel, a second power switching circuit connected to the vehicle battery in parallel, a third power switching circuit connected to the vehicle battery in parallel, a controller configured to control a switching operation of the first power switching circuit and a switching operation of the second power switching circuit, and the electric motor comprising a first winding coil and a second winding coil that receive a driving current output from the inverter according to control by the controller, the method comprising:

determining, by the controller, whether a current vehicle driving mode is a low speed driving mode or a high speed driving mode;
adjusting, by a first coil switching circuit connected to a first output node of the first power switching circuit, in response to the current vehicle driving mode being in the low speed driving mode, a winding number of the first winding coil to be a maximum coil winding number;
adjusting, by a second coil switching circuit connected to a second output node of the second power switching circuit, in response to the current vehicle driving mode being in the low speed driving mode, a winding number of the second winding coil to be a maximum coil winding number;
adjusting, by the first coil switching circuit, in response to the current vehicle driving mode being in the high speed driving mode, the winding number of the first winding coil to be a minimum coil winding number;
adjusting, by the second coil switching circuit, in response to the current vehicle driving mode being in the high speed driving mode, the winding number of the first winding coil to be a minimum coil winding number,
wherein the first winding coil comprises a first stage, a second stage, and a third stage,
wherein the first coil switching circuit comprises a first switch configured to control an electrical connection between the first output node and the first stage, a second switch configured to control an electrical connection between the first output node and a connection node that serially connects the first stage and the second stage, and a third switch configured to control an electrical connection between the first output node and a connection node that serially connects the second stage and the third stage, and
wherein the adjusting of the winding number of the first winding coil to be the maximum coil winding number comprises:
turning on the first switch in the low speed driving mode according to control by the controller;
turning off the second switch in the low speed driving mode according to control by the controller; and
turning off the third switch in the low speed driving mode according to control by the controller.

10. The method of claim 9, wherein the adjusting of the winding number of the first winding coil to the maximum coil winding number comprises serially connecting, by the first coil switching circuit, a first stage of the first winding coil and a second stage of the first winding coil.

11. The method of claim 9, wherein the adjusting of the winding number of the first winding coil to the minimum coil winding number comprises disconnecting, by the first coil switching circuit, a first stage of the first winding coil and connecting, by the first coil switching circuit, a second stage of the first winding coil.

12. The method of claim 9, wherein
the first winding coil comprises a first stage and a second stage;
the first coil switching circuit comprises a first switch configured to control an electrical connection between the first output node and the first stage and a second switch configured to control an electrical connection between the first output node and a connection node that serially connects the first stage and the second stage; and the adjusting of the winding number of the first winding coil to be the minimum coil winding number comprises:
    turning off the first switch in the high speed driving mode according to control by the controller; and
    turning on the second switch in the high speed driving mode according to control by the controller.

\* \* \* \* \*